W. M. LEEDOM.
DIRECTION INDICATOR.
APPLICATION FILED OCT. 14, 1920.
1,395,645.
Patented Nov. 1, 1921.
2 SHEETS—SHEET 1.
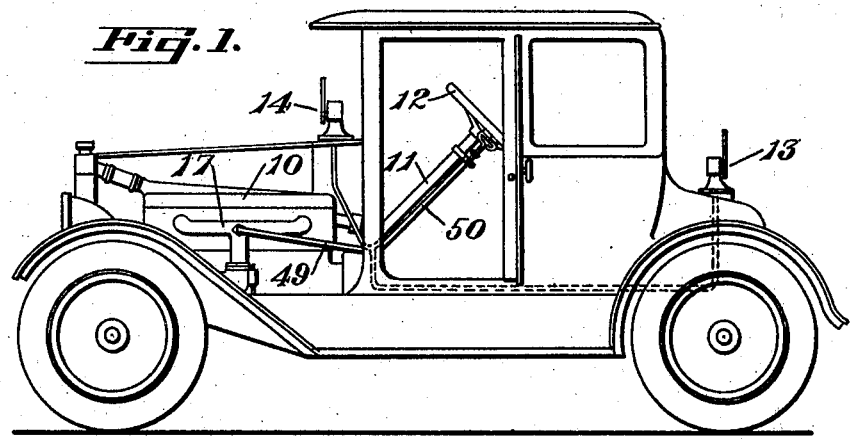
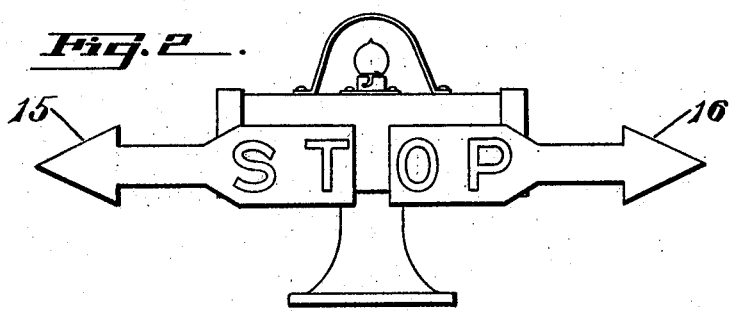
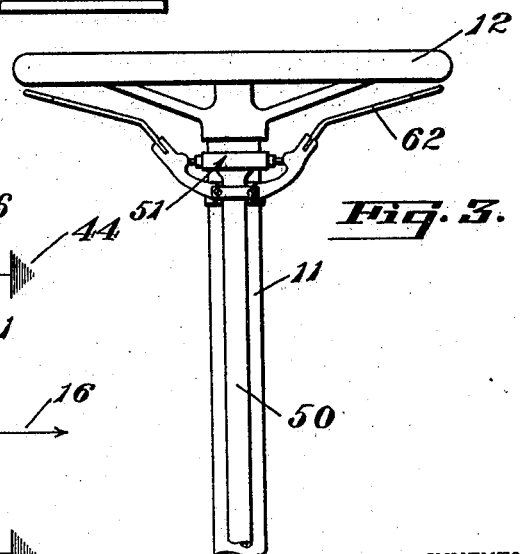
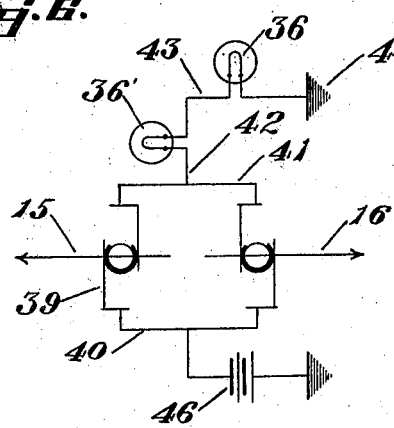
INVENTOR.
WALTER M. LEEDOM.
BY Chas E. Townsend
ATTORNEY

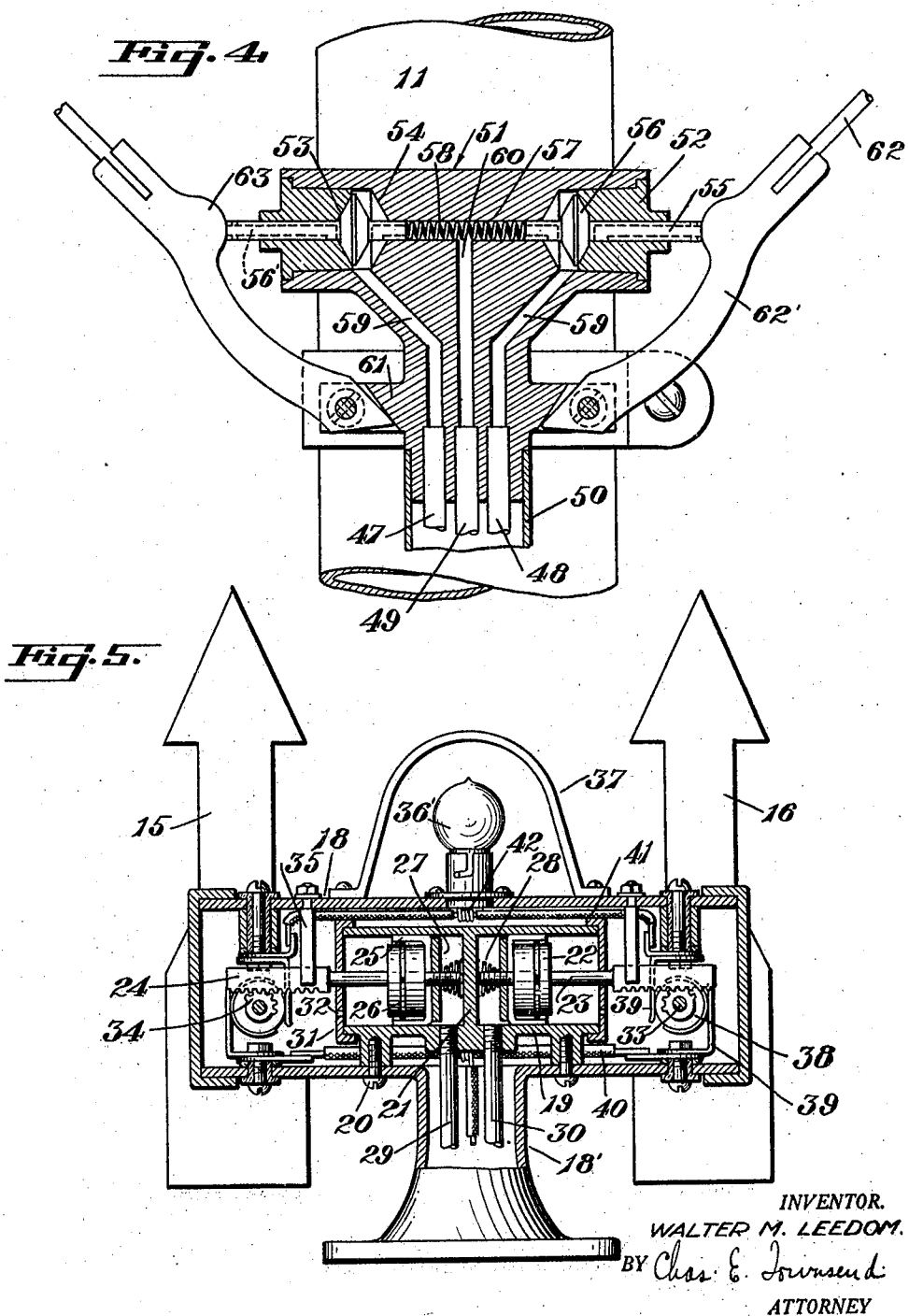

UNITED STATES PATENT OFFICE.

WALTER M. LEEDOM, OF OAKLAND, CALIFORNIA.

DIRECTION-INDICATOR.

1,395,645.  Specification of Letters Patent.  Patented Nov. 1, 1921.

Application filed October 14, 1920. Serial No. 416,840.

*To all whom it may concern:*

Be it known that I, WALTER M. LEEDOM, a citizen of the United States, residing at Oakland, in the county of Alameda and State of California, have invented new and useful Improvements in Direction-Indicators, of which the following is a specification.

This invention relates to a direction indicator for automobiles.

One of the objects of the invention is to provide a direction indicator for automobiles, operable from the steering wheel thereof. It is also an object of the invention that signals indicating the intention of the driver of an automobile may be simultaneously displayed on the front and rear of the car, said signals being operable from the steering wheel of the automobile. A further object of the invention is to provide operating means for the signals, whereby they will normally be disposed in position to signal that the automobile has stopped and immediately upon starting the engine of the automobile, the signals will automatically move to their non-signaling position.

The particular advantage of such an operating arrangement of the signals is that should the engine stop when not so intended by the driver, the fact is immediately communicated to following automobiles and thus avoids any chance of collision. Also, when the engine starts, the signals are automatically brought to non-signaling position, thus relieving the driver of this duty. The only duty remaining for the driver is to operate the signals when he wishes to turn either to the right or left, or to signal his intention of stopping, in case he intends to do so without stopping the engine.

A still further object of the invention is that means be provided to automatically illuminate the signals upon being made in order that the intended direction of the driver may be indicated at night.

Having reference to the accompanying drawings:

Figure 1 is a side elevation of an automobile, illustrating the application of my invention.

Fig. 2 is a rear elevation of the signal unit applied to the rear of the car.

Fig. 3 is a side elevation of the operating means for the signals, said means being secured to the steering post, as illustrated.

Fig. 4 is a vertical, central section of the signal operating means illustrated in Fig. 1.

Fig. 5 is a longitudinal, central, vertical section of the rear signal unit, as shown in Fig. 2.

Fig. 6 is a diagrammatic view illustrating the electric lighting circuit for illuminating the signals.

Referring to the drawings, A indicates, generally, an automobile, of which 10 is the engine, 11 the steering post and 12 the steering wheel. In this instance a signaling unit is mounted on the rear and front of the automobile, as indicated at 13 and 14, respectively. These signaling units are substantial duplicates with the exception of a few features which will later be described. Each unit is equipped with two arrows 15 and 16, as clearly shown in Fig. 2. The arrows of the first unit, however, are preferably plain white while the arrows of the rear unit are white and have the letters for forming the word "Stop" arranged thereon. The letters are arranged so that when both arrows are in their signaling position the word "Stop" is formed and when in other positions the letters have no significance.

The signals are held in their non-signaling position when the engine is running by a combined suction and vacuum action obtained by utilizing the suction created in the intake manifold of the engine, as indicated at 17, and each signal is normally held in signaling position by spring means.

Means for operating the signals will now be described. Reference being had to Fig. 5, it will be seen that each signal unit comprises a casing 18, which is preferably square in cross section, and having formed on its bottom a hollow pedestal 18'. Within the casing there is positioned a cylinder 19, which is rigidly held centrally of the casing by screws 20, said screws engaging in threaded openings provided in lugs formed on the extension of the cylinder.

The interior of the cylinder is divided by a central, vertical wall 21. In the chamber on each side of the wall 21 there is provided a piston head 22. Each piston head has a rod 23 extending centrally therethrough, the outer end of which is formed with a rack 24.

For each piston head there is provided a pack cap 25, and between the head and inner sides of the cap there is interposed an annular spring member 26, said spring being held in position by the provision of an annular groove in the piston head in which the spring may seat. The function of the spring member is to provide a constant tight running fit between the cylinder and piston head. A plate 27 holds the packing cap 25 in position and between this plate and partition there is interposed a spiral spring 28. The spring 28 encircles the inner end of the rod 23 and tends to push the piston outwardly. The rods 23 hold the piston heads 22 in spaced relation with the wall 21 for the purpose of always keeping open the pipes 29 and 30 which separately communicate with the cylinder chambers, as shown. The cylinder has each end closed by a suitable cap 31, said caps each having a central opening adapted to accommodate the piston rod 23 and also each is provided with a vent, as indicated at 32.

Near the outer ends of the casing 18 there is transversely mounted a shaft 33, which carries a segmental gear 34 in mesh with the rack 24. A fork-shaped member 35 for each rack is secured to the casing, having its prongs depending at opposite sides of the rack and thus preventing turning movement thereof and also acting as a guide to hold the rack in mesh with its segmental gear 34. On one end of each shaft 33, exteriorly of the casing 18, the arrows 15 and 16 are rigidly secured.

On top of each casing 18, for the front and rear signal units, there is mounted an electric light 36 and 36', respectively, and a reflector 37 for each light; the reflectors being arranged to illuminate the arrows when the electric lights are energized. The connections of the lights 36 are arranged so that when either of the arrows of the rear signal unit are in signaling position or when both are in signaling position, both lights will be energized. To accomplish this, the rear signal unit has mounted on each of its transverse shafts 33 a fiber ring 38, and upon the periphery of each fiber ring there is secured a metal strip which extends more than half the periphery.

A pair of diametrically opposed leaf brushes 39 are provided for each fiber ring, said brushes being secured in the top and bottom walls of the casing 18 and insulated therefrom, as shown in Fig. 5. The lower brushes are connected by an insulated wire 40 and the upper brushes by a wire 41. The upper wire also has connected thereto one side of the light 36', as indicated at 42; the other side of the light being connected through a wire 43 to one side of the front signal light 36, while the other side of the light 36 is grounded, as at 44 (Fig. 6).

The circuits for the lights are completed by leading a wire 45 from one side of a battery 46, or other source of supply, to the wire 40 and then grounding the other side of the source of supply, as shown in Fig. 6.

As shown in Fig. 5, the tendency of the springs 28 is to push the pistons outwardly, which in turn would lower the arrows downwardly to their signaling positions. As before stated, the arrows are held in their non-signaling position by means of a combined suction and vacuum action. In carrying this out and also for selectively operating the arrows for giving different signals the pipes 29 and 30 for each signal unit are led to the steering rod and there the two pipes which communicate with cylinders of the units, disposed on like sides, are formed, thus forming two pipes 47 and 48 (Fig. 4), which extend to the upper end of the steering post 11. Also a pipe 49 is connected to the intake manifold 17 and, likewise, extends up the steering post 11. The three pipes are inclosed in a casing 50 and their upper end is connected to an operating valve, generally indicated at 51.

This operating valve 51 is suitably secured to the steering post immediately below the steering wheel and comprises a T-shaped casting, the head of which is formed with an opening in each end adapted to receive a plug 52. The inner end of each plug is formed with an annular seat 53 and the inner ends of the openings are likewise formed with a complemental annular seat 54. Each plug is also formed with a central opening, extending longitudinally thereof and adapted to receive a pin 55. Each pin carries a double seating valve member 56, and formed in the central part of the T-head is an opening 57 which registers with the pins 55. The inner end of each pin projects into the opening 57 and between the inner ends of the pins there is interposed a compression spring 58. The spring 58 tends to normally seat the valve members 56 in the plugs 52. The pins 55 are also provided with a central, longitudinal opening 56' which, at its outer end, communicates with the atmosphere, while the inner end of the openings is formed to open at the side of the pins, as shown.

The inner end of each plug opening in the head of the stem communicates with a duct 59, each duct extending and communicating with one of the pipes 47 or 48. A duct 60 is also formed centrally of the stem of the T-shaped valve which communicates with the opening 57 and leads to the vacuum pipe 49.

On the stem portion of the valve 51 there is formed a pair of lugs 61, to each of which there is pivotally connected a lever 62'. The levers are mounted to prevent downward swinging, as shown, and on the upper end of each lever there is secured a T-shaped member 62, by which the levers may be lifted by the driver without removing his hands from the steering wheel. The levers are also formed with a protrusion 63 adapted to engage the outer ends of the pins 55.

In operation, the valve members 56 are normally in the position as shown in Fig. 4. If the engine of the automobile is running, the suction through the pipe 49 pulls the pistons 22 of each signal unit into the position shown in Fig. 5 which, in turn, hold the arrows in their vertical or non-signaling position. If the engine stops, thus killing the suction, the pistons will be forced outwardly by the tension of the springs 28 and the arrows all brought to their lowered or signaling position. When this occurs the arrows on the rear signal unit form the word "Stop" and also the lights on each signal unit will both be energized. In case it would not be desired to use the light during the daylight hours, a switch could be provided for that purpose.

Now, if the automobile is moving and it is desired to indicate that the driver intends to turn to the left, he merely needs to raise the corresponding lever 62 which would reseat the valve member in its seat 54. This would stop the suction action of the engine and the left-hand arrows would be brought into signaling position. The same operation with the right lever 62 would be repeated for giving the signal to turn to the right. In case it was intended to stop the automobile without stopping the engine, the driver would lift both levers 62. In either signaling operation the lights on both the front and rear signal units would be energized.

While I have shown and described the preferred form of my invention, it will be understood that various changes in the combination, construction and arrangement of parts may be made by those skilled in the art without departing from the spirit of the invention as claimed.

Having thus described my invention, what I claim and desire to secure by Letters Patent is—

1. In a direction indicator of the class described, in combination, a cylinder having a division wall centrally thereof, a piston in each end of the cylinder, an arrow swingingly mounted upon a shaft adjacent the outer end of each piston, and gear and rack means connecting each shaft with its respective piston, whereby when said pistons are moved inwardly to a predetermined degree, said arrows will assume a vertical position, and when said pistons are moved outwardly to a predetermined degree the arrows will assume a horizontal position.

2. In a direction indicator of the class described, in combination, a cylinder having a division wall centrally thereof, a piston in each end of the cylinder, an arrow swingingly mounted upon a shaft adjacent the outer end of each piston and transversely thereto, a spur gear carried by each shaft, a rack bar extending from each piston and engaging its associated spur gear, and guide means to hold said racks in engagement with the spur gears when said pistons are moved inward or outward.

3. In a direction indicator for automobiles comprising, in combination, a pair of arrows having letters arranged thereon to spell the word " Stop " when said arrows are disposed horizontally and extend in opposite directions, means for normally holding said arrows in their horizontal positions to indicate the word " Stop," means connected with the engine of the automobile adapted to produce a combined suction and vacuum whereby the arrows may be brought to a vertical and non-signaling position, and means controllable from the steering wheel of the automobile for controlling said combined suction and vacuum.

4. In a direction indicator for automobiles comprising, in combination, a cylinder with a division wall centrally thereof, a piston in each end of the cylinder, a pair of arrows mounted for swinging movement, and connecting means between said arrows and pistons whereby, when said pistons are moved inwardly to a predetermined point the arrows will assume a vertical position and when moved outwardly to a predetermined point the arrows will assume a horizontal position.

5. In a direction indicator for automobiles comprising, in combination, a cylinder with a division wall centrally thereof, a piston in each end of the cylinder, a pair of arrows mounted for swinging movement, connecting means between said arrows and pistons whereby, when said pistons are moved inwardly to a predetermined point, the arrows will assume a vertical position and when moved outwardly to a predetermined point the arrows will assume a horizontal position, and letters on said arrows to spell the word " Stop " when said arrows assume their horizontal positions.

6. In a direction indicator for automobiles comprising, in combination, a cylinder with a division wall centrally thereof, a piston in each end of the cylinder, a pair of arrows mounted for swinging movement, connecting means between said arrows and pistons whereby, when said pistons are moved inwardly to a predetermined point, the arrows will assume a vertical position and when moved outwardly to a predetermined point the arrows will assume a horizontal position, spring means for normally holding said arrows in their horizontal positions, and connecting means between the cylinder and engine of the automobile to cause a combined suction and vacuum for moving the pistons to a position where the arrows will assume a vertical position when the engine is running.

7. In a direction indicator for automobiles comprising, in combination, a cylinder with a division wall centrally thereof, a piston in each end of the cylinder, a pair of arrows mounted for swinging movement, connecting means between said arrows and pistons whereby, when said pistons are moved inwardly to a predetermined point, the arrows will assume a vertical position and when moved outwardly to a predetermined point the arrows will assume a horizontal position, spring means for normally holding said arrows in their horizontal positions, connecting means between the cylinder and engine of the automobile to cause a combined suction and vacuum for moving the pistons to a position where the arrows will assume a vertical position when the engine is running, and valve means interposed between said cylinder and engine whereby said suction and vacuum may be controlled, said valve means being operable from the steering wheel of the automobile.

8. In a direction indicator for automobiles, comprising in combination, a cylinder with a division wall centrally thereof, a piston in each end of the cylinder, a pair of arrows mounted for swinging movement, connecting means between said arrows and pistons whereby when said pistons are moved inwardly to a predetermined point, the arrows will assume a vertical position and when moved outwardly to a predetermined point the arrows will assume a horizontal position, spring means for normally holding said arrows in their horizontal positions, and connecting means between the cylinder and engine of the automobile to cause a combined suction and vacuum for moving the pistons to a position where the arrows will assume a vertical position when the engine is running, and valve means operable from the steering wheel of the automobile whereby said arrows may be brought to a horizontal position individually.

In testimony whereof I have hereunto set my hand in the presence of two subscribing witnesses.

WALTER M. LEEDOM.

Witnesses:
W. W. HEALEY,
M. E. EWING.